(12) United States Patent
Van Ende et al.

(10) Patent No.: US 11,999,426 B2
(45) Date of Patent: Jun. 4, 2024

(54) METHOD AND DEVICE FOR ESTIMATING A STEERING WHEEL TORQUE FOR A MECHANICAL FEEDBACK AT A STEERING WHEEL OF A STEERING SYSTEM OF A MOTOR VEHICLE

(71) Applicant: Volkswagen Aktiengesellschaft, Wolfsburg (DE)

(72) Inventors: Kristof Van Ende, Braunschweig (DE); Jonas Kaste, Alfeld (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 271 days.

(21) Appl. No.: 17/635,043

(22) PCT Filed: Jun. 25, 2020

(86) PCT No.: PCT/EP2020/067956
§ 371 (c)(1),
(2) Date: Feb. 14, 2022

(87) PCT Pub. No.: WO2021/032343
PCT Pub. Date: Feb. 25, 2021

(65) Prior Publication Data
US 2022/0289287 A1   Sep. 15, 2022

(30) Foreign Application Priority Data
Aug. 20, 2019   (DE) .................... 10 2019 212 432.1

(51) Int. Cl.
*B62D 6/00* (2006.01)
*G06N 20/00* (2019.01)

(52) U.S. Cl.
CPC ............. *B62D 6/008* (2013.01); *G06N 20/00* (2019.01)

(58) Field of Classification Search
CPC ......... B62D 6/008; B62D 6/007; G06N 20/00
See application file for complete search history.

(56) References Cited

U.S. PATENT DOCUMENTS 5,579,245 A    11/1996  Kato .............................. 702/150
6,728,615 B1    4/2004  Yao et al. ....................... 701/41
(Continued)

FOREIGN PATENT DOCUMENTS

CN    105083375 A    11/2015  ............... B62D 6/00
DE   102004005348 A1    8/2004  ............... B62D 5/04
(Continued)

OTHER PUBLICATIONS

German Search Report, Application No. 102019212432.1, 6 pages, Mar. 2, 2020.
(Continued)

*Primary Examiner* — Rodney A Butler
(74) *Attorney, Agent, or Firm* — Slayden Grubert Beard PLLC

(57) ABSTRACT

A method for estimating a steering wheel torque for a mechanical feedback at a steering wheel of a steering system of a motor vehicle is disclosed, comprising: receiving and/or detecting at least one current measurement value of at least one state variable of the motor vehicle by suitable input means; estimating the current steering wheel torque by means of a controller; outputting the estimated steering wheel torque as a steering wheel torque signal, wherein the estimation is carried out by means of a parameterizable steering model, wherein current measurement values of at least a subset of the at least one state variable are fed as input data to the parameterizable steering model for this purpose, and wherein nonlinearities of the steering system are esti-
(Continued)

mated based on the current measurement values of at least the subset of the at least one state variable using a method of artificial intelligence.

20 Claims, 2 Drawing Sheets

(56) References Cited

U.S. PATENT DOCUMENTS

| | | | |
|---|---|---|---|
| 9,889,878 B2 | 2/2018 | Konieczny et al. | |
| 10,071,764 B2 | 9/2018 | Carriazo-rabadán et al. | |
| 10,202,125 B2 | 2/2019 | Kasaiezadeh Mahabadi et al. | |
| 10,562,561 B2 | 2/2020 | Wang et al. | |
| 10,752,286 B2 | 8/2020 | Ko et al. | |
| 10,829,149 B1 * | 11/2020 | Garimella | G05D 1/0221 |
| 2020/0232859 A1 | 7/2020 | Farshizadeh et al. | |

FOREIGN PATENT DOCUMENTS

| | | | |
|---|---|---|---|
| DE | 102016014562 A1 | 6/2017 | B62D 5/04 |
| DE | 102016123618 A1 | 6/2017 | B62D 5/04 |
| DE | 102017108692 A1 | 10/2017 | B62D 5/04 |
| DE | 102016212097 A1 | 1/2018 | B62D 6/10 |
| DE | 102017126074 A1 | 5/2018 | B62D 15/02 |
| DE | 102018108107 A1 | 10/2018 | B60W 50/04 |
| DE | 102017110549 A1 | 11/2018 | B62D 6/00 |
| DE | 102017217470 A1 | 4/2019 | B62D 5/04 |
| DE | 102019212432 B3 | 12/2020 | B60W 40/10 |
| EP | 2448805 B1 | 1/2015 | B62D 15/02 |
| WO | 2021/032343 A1 | 2/2021 | B62D 6/00 |

OTHER PUBLICATIONS

International Search Report and Written Opinion, Application No. PCT/EP2020/067956, 7 pages, Dec. 1, 2020.
Chinese Office Action, Application No. 202080058433.6, 8 pages, Feb. 29, 2024.

* cited by examiner ns, and from the claims.
METHOD AND DEVICE FOR ESTIMATING A STEERING WHEEL TORQUE FOR A MECHANICAL FEEDBACK AT A STEERING WHEEL OF A STEERING SYSTEM OF A MOTOR VEHICLE

CROSS-REFERENCE TO RELATED APPLICATIONS

This application claims priority to German Patent Application No. DE 10 2019 212 432.1, filed on Aug. 20, 2019 with the German Patent and Trademark Office. The contents of the aforesaid Patent Application are incorporated herein for all purposes.

TECHNICAL FIELD

The invention relates to a method and a device for estimating a steering wheel torque for a mechanical feedback at a steering wheel of a steering system of a motor vehicle.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

The increase in global traffic is presenting automotive manufacturers with major challenges. One focus of research in the development departments here is the steering of motor vehicles. Here, for example, the electromechanical steering systems currently in use could be replaced by steer-by-wire steering systems. In steer-by-wire steering systems of this kind, the steering wheel and the steering system are completely decoupled mechanically. In order to still give the driver of the motor vehicle a familiar steering feel, artificial feedback of the steering is provided, for example by applying an artificial torque to the steering wheel.

SUMMARY

A need exists to improve a method and a device for estimating a steering wheel torque for a mechanical feedback at a steering wheel of a steering system of a motor vehicle.

The need is addressed by a method and a device according to the independent claims. Embodiments of the invention are described in the dependent claims, the following description, and the drawings.

DESCRIPTION

Figure 1:
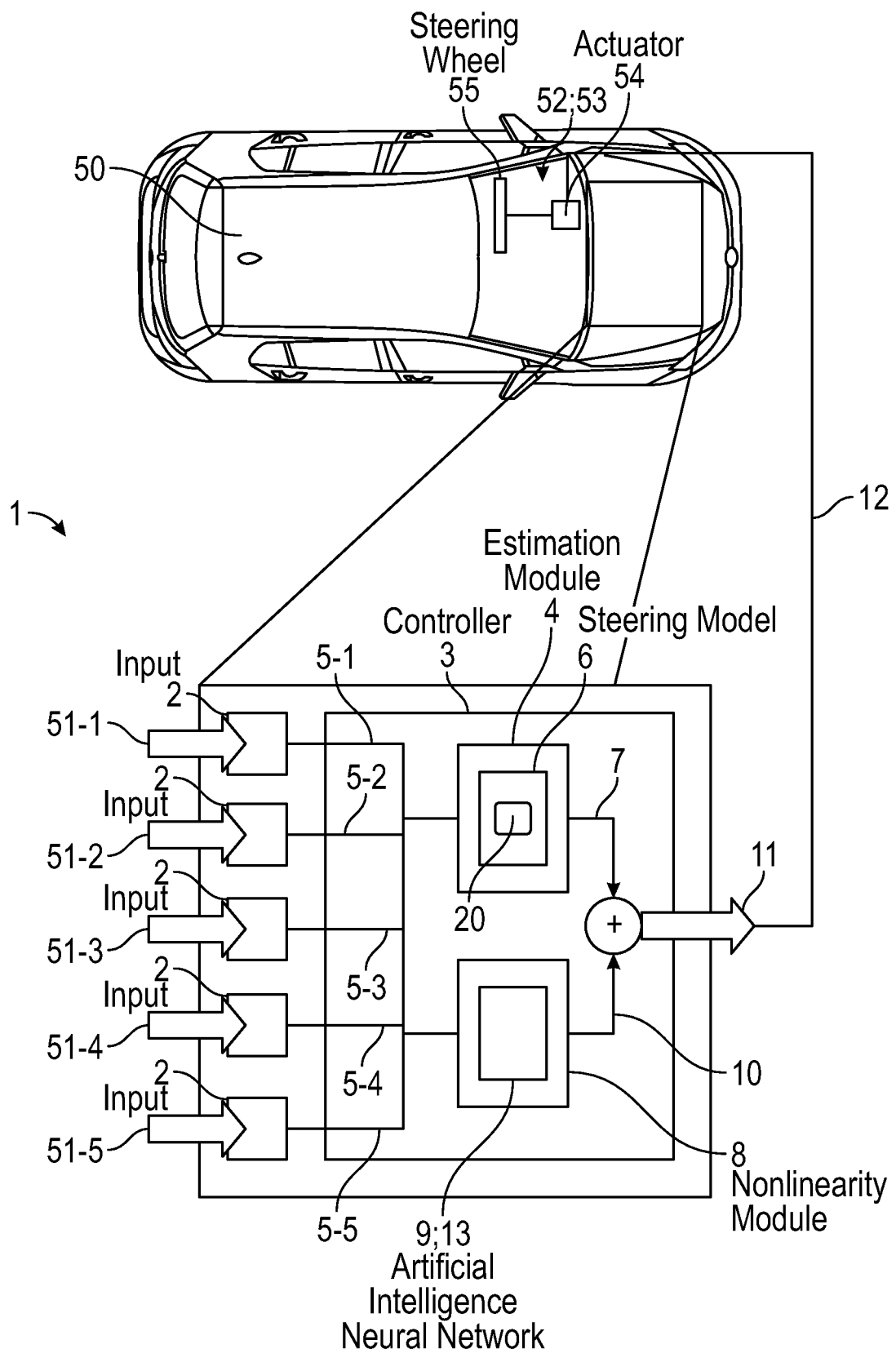
FIG. 1 shows a schematic representation of an embodiment of a device for estimating a steering wheel torque for a mechanical feedback at a steering wheel of a steering system of a motor vehicle.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In some embodiments, a method for estimating a steering wheel torque for a mechanical feedback at a steering wheel of a steering system of a motor vehicle is provided, comprising: receiving and/or detecting at least one current measurement value of at least one state variable of the motor vehicle by suitable input means, estimating the current steering wheel torque by means of a controller, outputting the estimated steering wheel torque as a steering wheel torque signal, wherein the estimation is carried out by means of a parameterizable steering model, wherein, for this purpose, current measurement values of at least a subset of the at least one state variable are fed as input data to the parameterizable steering model, and wherein nonlinearities of the steering system are estimated based on the current measurement values of at least the subset of the at least one state variable using a method of artificial intelligence.

In some embodiments, a device for estimating a steering wheel torque for a mechanical feedback at a steering wheel of a steering system of a motor vehicle is provided in particular, comprising input means for receiving and/or detecting at least one current measurement value of at least one state variable of the motor vehicle, a controller for estimating the current steering wheel torque and for outputting the estimated steering wheel torque as a steering wheel torque signal, wherein the controller is designed to carry out the estimation by means of a parameterizable steering model, and to feed current measurement values of at least a subset of the at least one state variable as input data to the parameterizable steering model for this purpose, and to estimate nonlinearities of the steering system based on the current measurement values of at least the subset of the at least one state variable using a method of artificial intelligence.

The teachings herein make it possible for both a more realistic steering feel to be produced and for the steering feel to be easily adjusted or changed. This is achieved in that the steering wheel torque of the steering wheel is estimated by means of two different methods. Both a parameterizable steering model is used, in particular a parameterizable physical steering model, such as is classically used, for example, in electric power steering systems or steer-by-wire steering systems, in order to estimate the steering wheel torque based on the detected and/or received current measurement values of the at least one state variable of the motor vehicle. In contrast, non-linearities occurring in the steering system of the motor vehicle, which are caused, for example, by friction, elasticities and/or play within the steering system, in particular non-constant friction, elasticities and/or play within the steering system, are estimated based on the detected and/or received current measurement values of the at least one state variable of the motor vehicle by means of a method of artificial intelligence. Together, this allows an improved steering wheel torque to be estimated and a more realistic steering feel to be generated, as a driver is familiar with from a classic electric power steering system. If a steering feel is to be changed, for example in order to use the method in a different motor vehicle, in particular a different type of motor vehicle, or in order to generate a steering feel that is desired for other reasons, parameters of the parameterizable steering model can be changed and adapted in a simple manner. The method of artificial intelligence, on the other hand, can be retained.

A benefit is that the method and the device can be used more flexibly than the known methods. Since the adaptation is carried out in particular by changing the parameters of the parameterizable steering model, a time-consuming and costly learning phase for the method of artificial intelligence that would otherwise be necessary for adaptation can be omitted.

In particular, the at least one state variable may comprise the following: a steering angle, a steering angle rate of change, a speed, a yaw rate, and/or a lateral acceleration.

The input means can in particular comprise a suitable sensor system for detecting current measurement values of the at least one state variable. Such a sensor system can, for example, be an inertial system that uses an inertial mass to detect translational and rotational accelerations and derives corresponding state variables of the motor vehicle from them. Furthermore, the input means may also comprise a suitable interface for querying current measurement values of the at least one state variable, for example via a CAN bus, from a vehicle controller. In particular, it may also be provided that individual ones or more of the at least one state variable are derived indirectly. For example, corresponding state variables can be generated with assistance of a Differential Global Positioning System (DGPS).

The term nonlinearity (nonlinearities) is intended to refer in particular to nonlinear effects in a mechanical feedback at a steering wheel, in particular nonlinear effects in the mechanical feedback such as occur in electric power steering. Such non-linear effects can be caused in particular by, in particular, non-constant, friction, elasticities and/or play, etc.

Methods of artificial intelligence are, in particular, methods that can be trained during a supervised and/or unsupervised learning phase to estimate at least one output value based on input data in an application or inference phase. For example, methods of artificial intelligence may comprise any of the following: a Bayesian network, statistical methods and/or statistical models (e.g., expectation-maximization algorithm) and/or artificial neural networks.

The controller can be designed as a combination of hardware and software, for example as program code executed on a microcontroller or microprocessor. However, it may also be provided that parts of the controller are individually or collectively designed as an application-specific integrated circuit (ASIC).

In some embodiments, it is provided that reference measurement values of the state variables of the motor vehicle detected during a reference run are used during a learning phase as reference input data of the parameterizable steering model and of the method of artificial intelligence, wherein respective steering wheel torques detected during the learning run respectively at the steering wheel by means of a steering wheel torque sensor form associated reference output values which are used during the learning phase as a reference for an estimated steering wheel torque. The reference input data and the associated reference output values are, in particular, reference data acquired at an electric power steering (EPS) system. By using such reference data, especially of an electric power steering system, a steering feel of a mechanical steering system can be aimed for as a reference during the learning phase. The acquired reference data is then used as ground truth in the learning phase. In particular, the reference data is acquired in a time-dependent or time-resolved manner and is provided for the learning phase.

It can be provided that separate reference data for different motor vehicle types (compact cars, midsize cars, minibuses, vans, luxury cars, etc.) are detected and provided, in order thereby to simulate a respective, characteristic steering feel.

In some embodiments, it is provided that the method of artificial intelligence is trained during the learning phase to estimate a difference between a steering wheel torque estimated based on the reference input data by means of the parameterizable steering model and an associated reference output value of the steering wheel torque. This allows the steering feel to be adjusted essentially using the parameterizable steering model. Any remaining difference between the steering feel targeted by the parameterizable steering model and the steering feel targeted via specification of the reference data is then estimated by means of the method of artificial intelligence. In particular, the difference represents the properties of the steering that are not detected or modeled by the parameterizable steering model. The estimated values for the steering wheel torque and the difference are then added together to produce an improved estimated value for the steering wheel torque.

In some embodiments, it is provided that the method of artificial intelligence comprises the use of an artificial neural network, wherein at least one subset of the at least one state variable is fed as input data to an input layer of the artificial neural network. At an output layer, the artificial neural network infers as output data an estimated value of, for example, the difference. In particular, the artificial neural network comprises at least one intermediate layer.

In some embodiments, it is provided that weights and parameters of the artificial neural network are determined during the learning phase. In particular, the artificial neural network is trained to estimate a difference between a steering wheel torque estimated by means of the parameterizable steering model and the reference output value of the reference data considered as ground truth.

In some embodiments, it is provided that also a structure of the artificial neural network can be changed during the learning phase. This can improve the performance of the artificial neural network. Furthermore, for example, a size of the artificial neural network and an associated computational effort during an application phase (inference phase) can also be reduced, for example, by pruning the artificial neural network.

In some embodiments, it is provided that the artificial neural network is retrained in a further learning phase after a change of parameters of the parameterizable steering model. In this way, nonlinearities of a steering system, which are, for example, vehicle-specific and/or vehicle type-specific, can be estimated in an improved manner. In contrast to a complete learning phase, performing the post-training can be carried out in a much more time-saving manner.

In the following, the invention is explained in more detail based on further embodiments, with reference to the FIGS. Specific references to components, process steps, and other elements are not intended to be limiting. Further, it is understood that like parts bear the same or similar reference numerals when referring to alternate FIGS.

FIG. 1 shows a schematic representation of an embodiment of the device 1 for estimating a steering wheel torque 11 for a mechanical feedback at a steering wheel 55 of a steering system 52 of a motor vehicle 50. The steering system 52 is in particular a steer-by-wire steering system 53. The device 1 comprises input means 2 for receiving and/or detecting current measurement values 5-x of state variables 51-x of the motor vehicle 50, and a controller 3.

The controller 3 comprises an estimation module 4 which estimates a first steering wheel torque 7 based on the detected and/or received current measurement values 5-x of the state variables 51-x by means of a parameterizable steering model 6. The parameterizable steering model 6 is parameterizable or parameterized via vehicle-specific and/or vehicle-type-specific and/or individual parameters 20. The parameterizable steering model 6 can, for example, be provided as appropriately designed program code on a microcontroller or a microprocessor of the estimation module 4.

A simple example for the parameterizable steering model 6 assumes a steering model of a classic electric power steering. Starting from a force equilibrium, the acceleration of the rack of the electric power steering is linked to the moment from the pinion of the steering rack to the rack and the moment of the servomotor to the rack:

$$m*y''+F_t*+F_r=(M_r/r_1)+(M_s/r_2),$$

where m is the mass of the steering rack, y" is the second time derivative of a steering rack position y, $F_t*$ is the force resulting from the restoring forces of the wheels, $F_r$ is the friction, $M_r$ is the moment from the pinion of the steering column to the steering rack, $M_s$ is the moment of the steering servomotor to the steering rack, $r_1$ is the gear ratio of the steering column to the steering rack, and $r_2$ is the gear ratio of the servomotor to the steering rack. Since all other values are also known or can be calculated, for example, for a steer-by-wire steering system 53 or are fixed as parameters for evoking a certain steering feel or can be estimated during a learning phase (cf. FIG. 2), the first steering wheel torque 7 can be estimated via the moment $M_r$ based on this steering model. In the case of the steer-by-wire steering system 53, the moment $M_s$ of the servomotor is calculated here in particular using a steering angle detected as a state variable 51-x at the steering wheel 55 and a detected or derived steering wheel angle change rate. As an alternative to this simple example, other parameterizable steering models 6 can also be used.

Furthermore, the controller 3 comprises a nonlinearity module 8 which estimates current nonlinearities 10 of the steering system based on the detected and/or received current measurement values 5-x of the state variables 51-x by means of a method of artificial intelligence 9, in particular by means of an artificial neural network 13. The method of artificial intelligence 9, in particular the artificial neural network 13, can be provided, for example, as appropriately designed program code on a microcontroller or a microprocessor of the nonlinearity module 8.

The estimated current first steering wheel torque 7 and the estimated current nonlinearities 10 are added together and together result in an estimated current steering wheel torque 11. The estimated current steering wheel torque 11 is output as a steering wheel torque signal 12 and provided, for example, to apply a torque corresponding to the estimated current steering wheel torque 11 to an actuator 54 at the steering wheel 55 provided for this purpose. A driver of the motor vehicle 50 thereby receives a mechanical feedback at the steer-by-wire steering system 53 which corresponds to that of an electromechanical steering (e.g. electric power steering).

In particular, it is provided that reference measurement values of the state variables 51-x of the motor vehicle 50 acquired during a reference run are used during a learning phase as reference input data of the parameterizable steering model 6 and of the method of artificial intelligence 9, in particular of the artificial neural network 13, wherein respective steering wheel torques detected during the learning run respectively at the steering wheel 55 by means of a steering wheel torque sensor form associated reference output values which are used during the learning phase as a reference for the estimated steering wheel torque 11.

In this context, it is provided in particular that the method of artificial intelligence 9, in particular the artificial neural network 13, is trained within the scope of the learning phase to estimate a difference between a first steering wheel torque 7 estimated based on the reference input data by means of the parameterizable steering model 6 and an associated reference output value of the steering wheel torque. The difference then comprises the nonlinearities 10, in particular.

Figure 2:
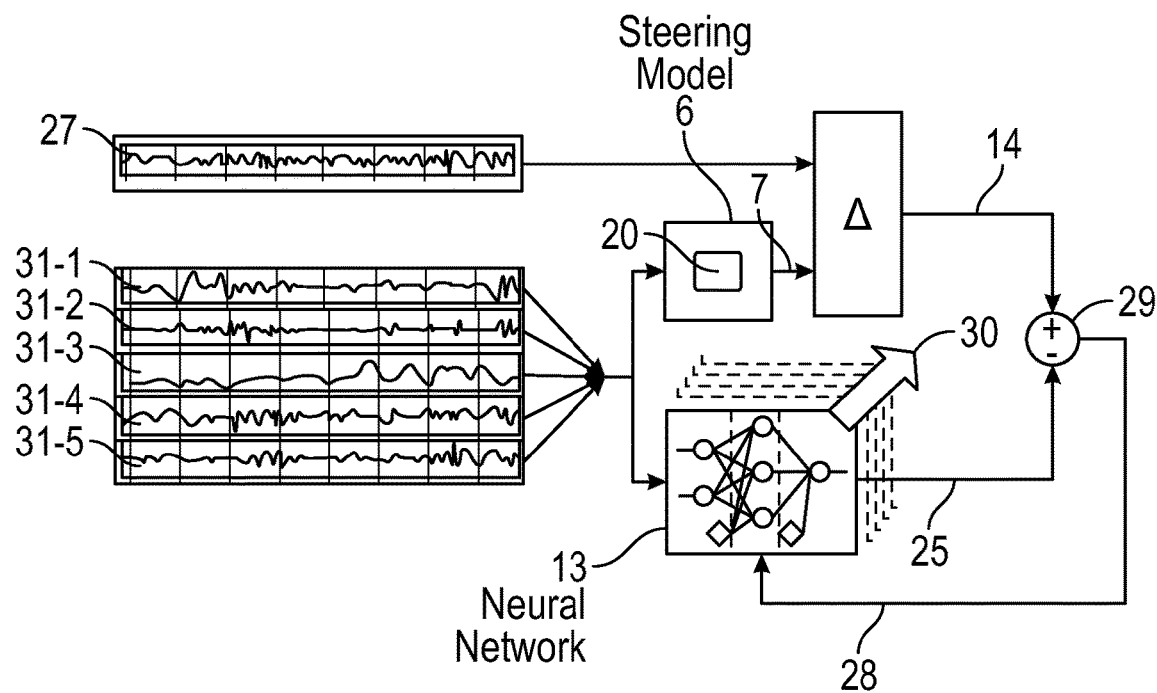
FIG. 2 shows a schematic diagram for illustrating a learning phase of an embodiment, using an artificial neural network as an example.

A schematic diagram for illustrating the learning phase is shown in FIG. 2 using an artificial neural network 13 as an example. The reference input data 31-x may belong, for example, to the following state variables of the motor vehicle: a lateral acceleration, a yaw rate, a speed, a steering angle and/or a steering angle rate. The state variables or the reference input data 31-x are acquired, for example, during a reference run by sensors provided for this purpose and are recorded in a time-dependent manner for a certain period of time. The learning phase can then be carried out based on the recorded reference input data 31-x. Parallel to this, a reference value-output value 27 is detected over time. This reference value-output value 27 is a steering wheel torque measured directly at the steering wheel. If the steering system is an electromechanical steering system (e.g. an electric power steering system), a corresponding torque sensor coupled to the steering wheel is used for this purpose, for example.

The reference input data 31-x are fed to the parameterizable steering model 6. This is parameterized to produce a desired steering feel and estimates a first steering wheel torque 7 based on the reference input data 31-x.

A difference 14 is formed from the reference value-output value 27 and the estimated first steering wheel torque 7. This difference 14 is a measure of non-linearities occurring in the (reference) steering system, i.e. non-linear effects such as friction, elasticities and/or play, etc.

During the learning phase, the artificial neural network 13 is trained to estimate a value for the difference 14 based on the reference input data 31-x.

In a first action of the learning phase, for example, a topology of the artificial neural network 13 is randomly selected. If only one hidden layer is present, this can be, for example, a number of neurons in the hidden layer. The respective weights and the parameters for individual neurons of the artificial neural network 13 are also randomly selected.

In a next action, the reference input data 31-x are fed to the artificial neural network 13 as input data and an output value 25 is calculated. In more precise terms, the time-dependent reference input data 31-x are fed to the artificial neural network 13 as input data and an associated output value 25, which is also time-dependent, is inferred accordingly by the artificial neural network 13.

The output value 25 inferred by the artificial neural network 13 is then compared with the difference 14. From this, an optimization criterion 28 is determined. Such an optimization criterion 28 can be, for example, an error function 29, for example the mean square error between the output value 25 and the difference 14. The optimization criterion 28 is also a function of time. The optimization criterion 28 can then be summarized over time, for example by summation.

The weights and the parameters of the neurons of the artificial neural network 13 are adjusted with assistance of optimization methods, for example, the Levenberg-Marquardt Back Propagation (LMBP) method, such that the optimization criterion 28 is improved, for example by minimizing a mean square error. This optimization 30 is repeated until the optimization criterion 28 is satisfied, for example a mean square error has fallen below a predetermined value.

The weights and parameters available after performing the learning phase are used in estimating the difference, that is, in particular, the nonlinearities.

The procedure is identical in principle for other methods of artificial intelligence. The respectively used method or the parameters of the respective method are determined during a learning phase, respectively based on a suitable optimization criterion 28.

Figure 3:
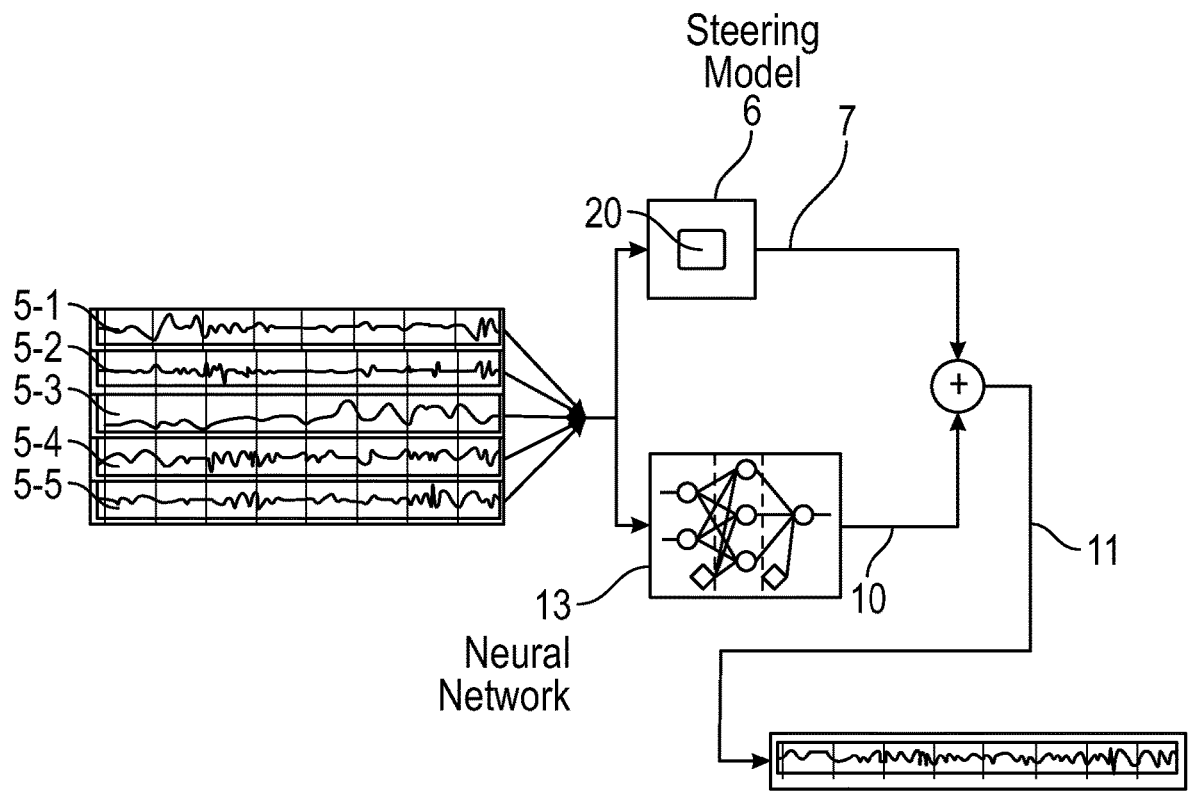
FIG. 3 shows a schematic flow diagram for illustrating an embodiment.

FIG. 3 shows a schematic flow diagram for illustrating an embodiment of the method. The current measurement values 5-$x$ of the state variables of the motor vehicle are continuously fed both to the parameterizable steering model 6 and to the trained artificial neural network 13 as input data.

Based on the current measurement values 5-$x$, the parameterizable steering model 6 continuously estimates a current first steering wheel torque 7. Also based on the current measurement values 5-$x$, the trained artificial neural network 13 simultaneously infers a difference or the nonlinearities 10 of the steering system or in the steering feel. The estimated current first steering wheel torque 7 and the inferred nonlinearities 10 are summed. The sum signal is a continuously estimated steering wheel torque 11.

The estimated steering wheel torque 11 is then fed to an actuator at a steering wheel of a motor vehicle. In particular, the estimated steering wheel torque 11 is used to provide a mechanical feedback to a steer-by-wire steering system 53 (cf. FIG. 1).

A benefit of the device and the method is that, despite an improved estimate of the steering wheel torque 11, it is still possible to easily adjust parameters of the parameterizable steering model 6.

Through this, a steering feel can be adjusted. Training of the artificial neural network 13, on the other hand, is not necessary.

However, it may be provided that the artificial neural network 13 is re-trained in a further learning phase after parameters 20 of the parameterizable steering model 6 have been changed.

LIST OF REFERENCE NUMERALS

1 Device
2 Input means
3 Controller
4 Estimation module
5-$x$ Measurement value
6 Parameterizable steering model
7 First steering wheel torque
8 Nonlinearity module
9 Method of artificial intelligence
10 Current nonlinearity
11 Estimated steering wheel torque
12 Steering wheel torque signal
13 Artificial neural network
14 Difference
20 Parameter
25 Output value
27 Reference output value
28 Optimization criterion
29 Error function
30 Optimization
31-$x$ Reference input data
50 Motor vehicle
51-$x$ State variable
52 Steering system
53 Steer-by-wire steering
54 Actuator
55 Steering wheel The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" used throughout the specification means "for example, for instance, or as an exemplification".

The mere fact that certain measures are recited in mutually different dependent claims or embodiments does not indicate that a combination of these measures cannot be used to advantage. Any reference signs in the claims should not be construed as limiting the scope.

What is claimed is:

1. A method for estimating a steering wheel torque for a mechanical feedback at a steering wheel of a steering system of a motor vehicle, comprising:
receiving and/or detecting at least one current measurement value of at least one state variable of the motor vehicle by a suitable input;
estimating the current steering wheel torque using a controller;
outputting the estimated steering wheel torque as a steering wheel torque signal; wherein
the estimation is conducted by using a parameterizable steering model; wherein
current measurement values of at least a subset of the at least one state variable are fed as input data to the parameterizable steering model; and wherein
nonlinearities of the steering system are estimated based on the current measurement values of at least the subset of the at least one state variable using a method of artificial intelligence.

2. The method of claim 1, wherein one or more reference measurement values of the at least one state variable of the motor vehicle detected during a reference run are used during a learning phase as reference input data of the parameterizable steering model and of the method of artificial intelligence; wherein steering wheel torque data detected during a learning run at the steering wheel by a steering wheel torque sensor form associated reference output values which are used during the learning phase as a reference for an estimated steering wheel torque.

3. The method of claim 2, wherein the method of artificial intelligence is trained during the learning phase to estimate a difference between a steering wheel torque estimated based on the reference input data using the parameterizable steering model and an associated reference output value of the steering wheel torque.

4. The method of claim 1, wherein the method of artificial intelligence comprises using an artificial neural network, wherein at least a subset of the at least one state variable is fed as input data to an input layer of the artificial neural network.

5. The method of claim 4, wherein weights and parameters of the artificial neural network are determined during the learning phase.

6. The method of claim 4, wherein a structure of the artificial neural network may be changed during the learning phase.

7. The method of claim 1, wherein an artificial neural network is retrained in a further learning phase after a change of parameters of the parameterizable steering model.

8. A device for estimating a steering wheel torque for a mechanical feedback at a steering wheel of a steering system of a motor vehicle, comprising:
   an input for receiving and/or detecting at least one current measurement value of at least one state variable of the motor vehicle;
   a controller for estimating a current steering wheel torque and for outputting the estimated steering wheel torque as a steering wheel torque signal; wherein
   the controller is configured to conduct the estimation using a parameterizable steering model, to feed current measurement values of at least a subset of the at least one state variable as input data to the parameterizable steering model, and to estimate nonlinearities of the steering system based on the current measurement values of at least the subset of the at least one state variable using a method of artificial intelligence.

9. A motor vehicle comprising at least one device for estimating a steering wheel torque for a mechanical feedback at a steering wheel of a steering system of a motor vehicle, the device comprising:
   an input for receiving and/or detecting at least one current measurement value of at least one state variable of the motor vehicle;
   a controller for estimating a current steering wheel torque and for outputting the estimated steering wheel torque as a steering wheel torque signal; wherein
   the controller is configured to conduct the estimation using a parameterizable steering model, to feed current measurement values of at least a subset of the at least one state variable as input data to the parameterizable steering model, and to estimate nonlinearities of the steering system based on the current measurement values of at least the subset of the at least one state variable using a method of artificial intelligence.

10. The motor claim 9, the motor vehicle comprises a steer-by-wire steering system and the device is used to estimate the steering wheel torque for a steering wheel of the steer-by-wire steering system.

11. The method of claim 2, wherein the method of artificial intelligence comprises using an artificial neural network, wherein at least a subset of the at least one state variable is fed as input data to an input layer of the artificial neural network.

12. The method of claim 3, wherein the method of artificial intelligence comprises using an artificial neural network, wherein at least a subset of the at least one state variable is fed as input data to an input layer of the artificial neural network.

13. The method of claim 5, wherein a structure of the artificial neural network may be changed during the learning phase.

14. The method of claim 2, wherein an artificial neural network is retrained in a further learning phase after a change of parameters of the parameterizable steering model.

15. The method of claim 3, wherein an artificial neural network is retrained in a further learning phase after a change of parameters of the parameterizable steering model.

16. The method of claim 4, wherein the artificial neural network is retrained in a further learning phase after a change of parameters of the parameterizable steering model.

17. The method of claim 5, wherein the artificial neural network is retrained in a further learning phase after a change of parameters of the parameterizable steering model.

18. The method of claim 6, wherein the artificial neural network is retrained in a further learning phase after a change of parameters of the parameterizable steering model.

19. The method of claim 11, wherein weights and parameters of the artificial neural network are determined during the learning phase.

20. The method of claim 12, wherein weights and parameters of the artificial neural network are determined during the learning phase.

\* \* \* \* \*